United States Patent

[11] 3,581,114

[72] Inventor Robert E. Gregson
      Scottsdale, Ariz.
[21] Appl. No. 756,972
[22] Filed Sept. 3, 1968
[45] Patented May 25, 1971
[73] Assignee Motorola, Inc.
      Franklin Park, Ill.

[54] SCR SLAVING CIRCUIT
    5 Claims, 7 Drawing Figs.
[52] U.S. Cl. ........................................... 307/252,
                                                    307/305
[51] Int. Cl. .................................... H03k 17/00
[50] Field of Search .......................... 307/252,
            305; 328/81; 315/196, 197, 251

[56] References Cited
    UNITED STATES PATENTS
3,388,269  6/1968  Bertioli .................... 307/305

3,458,732  7/1969  Robinson .................. 307/273

*Primary Examiner*—Donald D. Forrer
*Assistant Examiner*—David M. Carter
*Attorney*—Mueller & Aichele ABSTRACT: An SCR slaving circuit wherein first and second controlled rectifiers are connected in parallel with each other and are further connected in series with a load across an AC line. A control signal is coupled to the gate electrode of the first controlled rectifier to control the slaving action in the circuit, and rectifier control circuitry is coupled between one side of the AC line and the gate electrode of the second controlled rectifier. The rectifier control circuitry blocks gate current to the second controlled rectifier on one-half cycle of the AC line voltage and thereafter provides gate current to turn on the second controlled rectifier. The second controlled rectifier will turn on the following half-cycle of the AC line voltage provided that the first controlled rectifier was conducting the previous half-cycle of the AC line voltage.

PATENTED MAY 25 1971 3,581,114
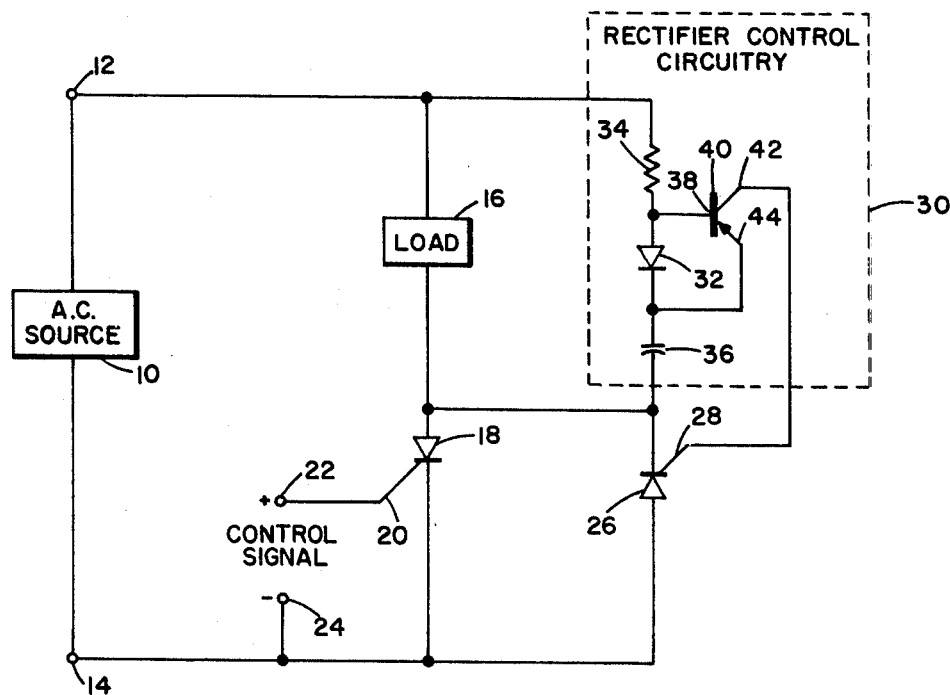
INVENTOR.
Robert E. Gregson
BY
ATTYS.

SCR SLAVING CIRCUIT

This invention relates generally to AC power control circuits and more particularly to an improved slaving circuit which is operative at a high efficiency.

BACKGROUND OF THE INVENTION

Hitherto it was known to connect controlled rectifiers in parallel across an AC line and apply a control signal to one of the rectifiers in order to control the average power delivered to a load. For example, the load may be an appliance, such as an electric heater, which is operative in response to impedance variations of a thermistor or the like to consume power for durations of time dictated by the ambient temperature.

When the known prior art slaving circuits are operating to provide full line voltage to a load during an "on" period, the slave and master controlled rectifiers, as they are sometimes called, are biased to conduction on alternate half-cycles of the AC line voltage. However, one disadvantage of the above-described prior art slaving circuits is that due to associated passive components in the circuits, the slave-controlled rectifier conducts gate current during the portion of the half-cycle of AC line voltage that the master controlled rectifier is conducting. That is, the ideal condition where the master and slave-controlled rectifiers exclusively conduct on each alternate half-cycle of the AC line voltage is not attained, and thus there is substantial power loss in the circuit as a result of gate current flowing in the slave controlled rectifier during the period when the master-controlled rectifier is conducting. Not only do the passive components in the circuit consume power, but the values of the passive components in the circuit must be carefully selected so that the slave-controlled rectifier is biased conductive and conducts for an acceptable period of each cycle of AC line voltage. In addition, the component values must be selected so there is insufficient charge left in the capacitor to fire the slave SCR for additional half cycles after the master SCR ceases to conduct.

SUMMARY OF THE INVENTION

An object of the present invention is to provide a new and improved slaving circuit operative with various types of applicances and other electrical equipment to which the average power is controlled.

Another object of the present invention is to provide a high efficient slaving circuit wherein minimum power is consumed during the operation thereof.

A further object of the present invention is to provide a slaving circuit of the type described which is simple and easy to build and which does not require strict tolerances for the component values used therein.

The present invention features rectifier control circuitry connected to the gate electrode of the slave-controlled rectifier. This rectifier control circuitry is responsive to one-half cycle of AC line voltage to block gate current to the slave-controlled rectifier and is responsive to the following half-cycle of AC line voltage to provide gate current to the slave-controlled rectifier, thereby enabling alternate conduction of slave and master-controlled rectifiers within the slaving circuit.

Another feature of this invention is the provision of a diode and a transistor connected to a capacitor in the rectifier control circuitry. The diode provides a charge path to the capacitor and maintains the transistor cutoff on one-half cycle of AC line voltage, and the transistor provides a discharge path for the capacitor and a gate firing current to the slave controlled rectifier near the end of the one-half cycle of AC line voltage. This gate-firing current is present during the next half-cycle of AC line voltage after turning on the slave-controlled rectifier and ensures zero point switching for the next following alternate half-cycle of AC line voltage.

These and other objects and features of this invention will become more fully apparent in the following description of the drawing.

IN THE DRAWING

The present invention is illustrated in schematic diagram in the single figure of the accompanying drawing.

BRIEF DESCRIPTION OF THE INVENTION

Briefly described, the present invention is directed to a controller rectifier (SCR) slaving circuit wherein a first or master SCR is connected in parallel with a second or slave SCR, and these two SCRs are serially connected to a load across a source of AC line voltage. Rectifier control circuitry is connected to the gate of the slave SCR and to a common junction between the slave and master SCRs. The rectifier control circuitry includes a capacitor and diode serially connected between the AC line and the slave and master SCRs, and the capacitor charges through the diode and the master SCR on one-half cycle of the AC line voltage. A transistor within the rectifier control circuitry has two electrodes thereof connected to the opposite electrodes of the diode and a third electrode thereof is connected to the gate electrode of the slave SCR. The diode biases the transistor cutoff as the capacitor is charging up during the one-half cycle of AC line voltage that the master SCR is on, and upon reaching reverse bias, the diode forward biases the transistor conductive to discharge the capacitor into the gate electrode of the slave SCR. This gate current supplied from the capacitor into the gate of the slave SCR occurs near the end of the half-cycle that the master SCR has been conducting, and the gate current is maintained into the first part of the alternate half-cycle at which time the slave SCR will become forward biased anode to cathode and turn on.

DETAILED DESCRIPTION OF THE INVENTION

Referring in detail to the accompanying drawing, there is shown a slaving circuit having input terminals 12 and 14 connected to a source 10 of AC line voltage. A load 16 is connected between terminals 12 and 14 and conducts alternating current therethrough when the slaving circuit is biased conductive by a control signal applied between terminals 22 and 24. The control signal is applied to the gate 20 of a first or master-controlled rectifier (SCR) 18 and rectifier 18 is connected in parallel with and poled oppositely to a second or slave controlled rectifier (SCR) 26. The controlled rectifiers 18 and 26 are referred to herein as SCRs, although within the scope of this invention these devices are not limited to silicon-controlled rectifiers.

The novel rectifier control circuitry 30 is connected as shown to the two SCRs 18 and 26, and in parallel with the load 16. This rectifier control circuitry includes a current limiting resistor 34 connected in series with a diode 32 and a capacitor 36 between terminal 12 and a common junction of SCRs 18 and 26. A semiconductor device 38, such as a PNP transistor, has two electrodes thereof connected to opposite ends of the diode 32 and a third or output electrode thereof connected directly to the gate electrode 28 of the second or slave SCR 26.

OPERATION

The slaving circuit according to the present invention is operative to conduct load current only when a control signal above a predetermined magnitude is applied to the gate 20 of the master SCR 18, and this control signal may be either DC or a lower pulse. If the control signal is synchronized with line voltage, the slaving circuit is operable as an excellent zero point switch.

Assume initially that the AC line voltage at input terminal 12 is going positive and that a control signal applied between control terminals 22 and 24 is sufficient to bias the first or slave-controlled rectifier 18 conductive. As SCR 18 conducts on one-half cycle of the AC line voltage, current flows through the load 16 and through the resistor 34 and diode 32 to charge capacitor 36 through the SCR 18. With diode 32 conducting, the PNP semiconductor device 38 is biased nonconducting and no gate current flows to the gate electrode 28 of the slave-controlled rectifier 26. The charging time constant of R34, C36 is selected so that the capacitor 36 charges for practically the entire half-cycle of AC line voltage that SCR 18 conducts. The charging rate of capacitor 36 follows an S-shaped curve, charging slowly at first, then faster as the line voltage peaks, and finally slowly again as the line voltage decreases toward zero volts. When the line voltage 10 falls below the voltage across capacitor 36, the diode 32 becomes reverse biased and in turn forward biases the emitter-base junction of PNP transistor 38. For values listed in the table below, transistor 38 turns on at approximately 174° of the first half-cycle of AC line voltage.

When the emitter-base junction of transistor 38 becomes forward biased, capacitor 36 discharges into the emitter 44 and through the emitter-base junction of transistor 38. When transistor 38 turns on, its base current is supplied by capacitor 36 discharging therethrough, through resistor 34 and through the load 16. This action biases transistor 38 into full conduction and capacitor 36 completely discharges through the emitter-collector path of transistor 38 and into the gate 28 of the second or slave-controlled rectifier 26. Thus, as the end of the first half-cycle of AC line voltage is reached, the slave SCR 26 is turned on for the first time and remains conducting until the end of the next half-cycle of AC line voltage. As the slave SCR 26 conducts, capacitor 36 is completely discharged. Since the slaving circuit completely discharges capacitor 36 during the half-cycle of AC line voltage that SCR 26 is conducting, the possibility of SCR 26 being slaved for the succeeding half cycle after drive is removed from SCR 18 is completely eliminated.

The current pulse that turns the slave SCR 26 on initially must last until the next half-cycle of AC line voltage reaches a magnitude that will maintain conduction in SCR 26. For the values given in the table below, a current pulse having a 100 milliampere peak and exceeding 50 milliamps when the anode-cathode voltage of SCR 26 +10 volts has been measured.

The peak current duration in the rectifier control circuitry 30 is controlled by the value of resistor 34, so that a judicious selection of resistor 34 may be made for any given family of master and slave SCRs 18 and 24 and any specific slaving circuit application. It is required, however, that the particular SCRs 18 and 26 used must be capable of handling the maximum current requirements of the load 16 to be driven. This load may vary widely from appliance to appliance and to various types of heavier equipment in which the slaving circuit may be operated.

Listed in the table below are values and ratings of a circuit of the type described which was actually built and successfully operated.

TABLE

| Component | Value or type |
| --- | --- |
| Line voltage 10 | 110 volts AC. |
| SCR 18 | 2N4443. |
| SCR 26 | 2N4443. |
| Diode 32 | IN 4003. |
| Resistor 34 | 10,000 ohms, 2 watts. |
| Capacitor 36 | 5 microfarads, 50 volts electrolytic. |
| Transistor 38 | MPS 3638. |

However, the above table should not be construed as limiting the scope of the present invention. Accordingly, said invention is limited only by way of the following appended claims.

I claim:
1. An AC control circuit including, in combination:
a first controlled rectifier connected in series with a load between circuit input terminals which are adapted for connection to a source of AC line voltage,
a second controlled rectifier poled opposite to and connected in parallel with said first controlled rectifier, and
rectifier control means including a capacitor connected to a gate electrode of said second controlled rectifier and responsive to one-half cycle of AC line voltage to cause charging of said capacitor and to block gate current to said second controlled rectifier during substantially all of said half-cycle, said rectifier control means further responsive to another half-cycle of AC voltage to discharge said capacitor to provide gate current to said second controlled rectifier to drive same into conduction, whereby said first and second controlled rectifiers conduct on alternate half-cycles of the AC line voltage.

2. The combination defined in claim 1 wherein said rectifier control means includes:
a diode coupled to one of said input terminals,
said capacitor connected between said diode and said first controlled rectifier, said capacitor charging up to a predetermined voltage on one-half cycle of the AC line voltage and reverse biasing said diode, and
a semiconductor device having input, output and control electrodes, said semiconductor device connected between said capacitor and said second controlled rectifier and operative to discharge said capacitor and fire said second controlled rectifier when the AC line voltage initially forward biases said second controlled rectifier.

3. The combination defined in claim 2 wherein said diode is connected between the input and control electrodes of said semiconductor device and maintains said semiconductor device cutoff until said second controlled rectifier has been conducting for a previous half-cycle and the AC line voltage reaches a predetermined magnitude.

4. The combination defined in claim 3 which further includes a current limiting resistor connected between said one of said input terminals and said diode for limiting the base drive to said semiconductor device and for controlling the charging time of the capacitor.

5. The combination defined in claim 4 wherein:
said semiconductor device is a transistor,
said load is connected between said one input terminal and a common junction of the anode of said first controlled rectifier and the cathode of said second controlled rectifier,
said capacitor discharging through the emitter-base junction of said transistor, through said current limiting resistor and through said load upon reaching a predetermined charging voltage, said capacitor thereafter discharging through the emitter-collector path of said transistor and into the gate electrode of said second controlled rectifier to fire said second controlled rectifier when the AC line voltage initially goes positive anode-to-cathode of said second controlled rectifier.